(12) United States Patent
Soliman

(10) Patent No.: US 8,116,762 B2
(45) Date of Patent: Feb. 14, 2012

(54) METHOD AND SYSTEM FOR PROVIDING AERONAUTICAL COMMUNICATION SERVICES

(75) Inventor: Samir S. Soliman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1167 days.

(21) Appl. No.: 11/258,726

(22) Filed: Oct. 25, 2005

(65) Prior Publication Data

US 2006/0199532 A1    Sep. 7, 2006

Related U.S. Application Data

(60) Provisional application No. 60/657,827, filed on Mar. 1, 2005, provisional application No. 60/684,777, filed on May 25, 2005.

(51) Int. Cl.
*H04B 7/185* (2006.01)
*H04W 4/00* (2009.01)
*H04W 40/00* (2009.01)

(52) U.S. Cl. ....... 455/429; 455/12.1; 455/13.1; 455/427

(58) Field of Classification Search ............ 455/20, 455/427, 428, 429.431, 429
See application file for complete search history.

(56) References Cited

U.S. PATENT DOCUMENTS

| 3,825,929 | A | * | 7/1974 | Toman | 342/33 |
| 5,557,656 | A | * | 9/1996 | Ray et al. | 455/431 |
| 5,664,006 | A | * | 9/1997 | Monte et al. | 455/405 |
| 5,701,344 | A | * | 12/1997 | Wakui | 381/1 |
| 6,430,412 | B1 | * | 8/2002 | Hogg et al. | 455/436 |
| 6,735,438 | B1 | * | 5/2004 | Sabatino | 455/427 |
| 7,505,736 | B2 | * | 3/2009 | Min | 455/12.1 |
| 7,636,566 | B2 | * | 12/2009 | Karabinis | 455/427 |
| 7,715,783 | B2 | * | 5/2010 | Girard et al. | 455/3.02 |
| 2004/0036648 | A1 | * | 2/2004 | Carson | 342/157 |

OTHER PUBLICATIONS

D'Aria G. et al: "Terrestrial Flight Telephone System: Integration Issues for a Pan-European Network" Proceedings of the Nordic Seminar on Digital Mobile Radio Communications. Helsinki, Dec. 1-3, 1992, Helsinki, Telecom Finland, FI, vol. Seminar 5, Dec. 1, 1992, pp. 123-130, left hand column, paragraph 1-4.
OA dated Jan. 22, 2009 for RU Application Serial No. 2007136113/11, 20 pages.

* cited by examiner

*Primary Examiner* — Tilahun B Gesesse

(57) ABSTRACT

Aeronautical communication services is disclosed. For example, an aeronautical vehicle for use in a first aeronautical communication system to allow communication to and from a land-based station is disclosed, wherein the land-based station transmits communications using a first low frequency band and receives communications using a second low frequency band in accordance with a second aeronautical communication system. In the first aeronautical communication system, the aeronautical vehicle transmits communications using the first low frequency band and receives communications using the second low frequency band.

19 Claims, 4 Drawing Sheets

US 8,116,762 B2

METHOD AND SYSTEM FOR PROVIDING AERONAUTICAL COMMUNICATION SERVICES

CLAIM OF PRIORITY UNDER 35 U.S.C. §119

The present Application for Patent claims priority to Provisional Application No. 60/657,827 entitled "METHOD AND SYSTEM FOR PROVIDING AERONAUTICAL TELECOMMUNICATION SERVICES" filed Mar. 1, 2005, and Provisional Application No. 60/684,777 entitled "METHOD AND SYSTEM FOR PROVIDING AERONAUTICAL COMMUNICATION SERVICES" filed May 25, 2005, and assigned to the assignee hereof and hereby expressly incorporated by reference herein.

BACKGROUND

1. Field

The present disclosure relates generally to aeronautical communication services, and more specifically, to methods and systems for providing aeronautical communication services via efficient management of frequency band.

2. Background

The demand for aeronautical broadband communications is on the rise. Such increase in demand is attributed to deployment of applications or services which require aeronautical broadband communications. Applications range from in-flight entertainment, telemedicine, flight security, and flight logistics and maintenance. For example, by providing such applications on an aircraft, air travel can be made more productive, pleasant and secure. However, the cost of making such applications available on aeronautical vehicles such as aircrafts is substantial. Therefore, most airlines and the aircraft industry are looking for ways to provide such applications or services as economically as possible.

One of the key issues in the design of aeronautical broadband communications system is the availability of frequency spectrum. Available spectrum in the low frequencies is scarce crowded, as most of that spectrum is already occupied or used by existing services. One such service which occupies the spectrum in the low frequency range of below 3 GHz is the Mobile Satellite Service (MSS).

Due to this restricted bandwidth availability at low frequency and increasing data rate requirements, broadband aeronautical services are therefore generally operated at high frequencies such as the Ka or Ku bands. Operating at such high frequencies, however, has a number of disadvantages including, for example, higher power requirements and resulting costs.

Hence, it would be desirable to have more efficient methods and systems for managing frequency bands in order to provide aeronautical communication services in the low frequency spectrum.

SUMMARY

The techniques disclosed herein address at least the above stated needs. In one aspect, an apparatus disclosed for an aeronautical vehicle in a first aeronautical communication system to allow communication to and from a land-based station, wherein the land-based station transmits communications using a first low frequency band and receives communications using a second low frequency band in accordance with a second aeronautical communication system. The apparatus comprises a transmitting unit configured to transmit communications using the first low frequency band; and a receiving unit configured to receive communications using the second low frequency band.

In another aspect, an aeronautical vehicle is disclosed for use in a first aeronautical communication system to allow communication to and from a land-based station, wherein the land-based station transmits communications using a first low frequency band and receives communications using a second low frequency band in accordance with a second aeronautical communication system. The aeronautical vehicle comprises a transmitting unit configured to transmit communications using the first low frequency band; and a receiving unit configured to receive communications using the second low frequency band.

In still another aspect, a method and processor are disclosed for use in an aeronautical vehicle in a first aeronautical communication system to allow communication to and from a land-based station, wherein the land-based station transmits communications using a first low frequency band and receives communications using a second low frequency band in accordance with a second aeronautical communication system. The method comprises transmitting communications using the first low frequency band; and receiving communications using the second low frequency band. The processor is configured to control transmission of communications using the first low frequency band; and reception of communications using the second low frequency band.

The apparatus, aeronautical vehicle, method and/or processor may further comprise an antenna coupled to the transmitting unit and the receiving unit, and configured to allow transmission and reception of communications; wherein the antenna is positioned at the bottom of the aeronautical vehicle. The antenna may be positioned at a fuselage of the aeronautical vehicle. Also, the communications may be transmitted using a frequency band of a L-band. The communications may be received using a frequency band of a S-band.

In a further aspect, a land-based station is disclosed in a first aeronautical communication system to allow communication to and from an aeronautical vehicle, wherein the aeronautical vehicle receives communications using a first low frequency band and transmits communications using a second low frequency band in accordance with a second aeronautical communication system. The land-based station comprises a receiving unit configured to receive communications using a first low frequency band; and a transmitting unit configured to transmit communications using a second low frequency band.

In still a further aspect, a method and processor are disclosed for use in a land-based station in a first aeronautical communication system to allow communication to and from an aeronautical vehicle, wherein the aeronautical vehicle receives communications using a first low frequency band and transmits communications using a second low frequency band in accordance with a second aeronautical communication system. The method comprises receiving communications using a first low frequency band; and transmitting communications using a second low frequency band. The processor is configured to control reception of communications using a first low frequency band; and transmission of communications using a second low frequency band.

The land-based station, method and/or processor may further comprise one or more aspects of an antenna configured to transmit and receive communications, wherein the antenna is aimed skyward; the antenna is positioned on top of the land-based station; the antenna is designed to minimize interference to the second aeronautical communication system; and the antenna is designed to generate a narrow directional beam. The antenna may also be a smart antenna system configured to generate the narrow beam antennas for tracking aeronautical vehicles. Also, the communications may be received using a frequency band of a L-band. The communications may be transmitted using a frequency band of a S-band.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
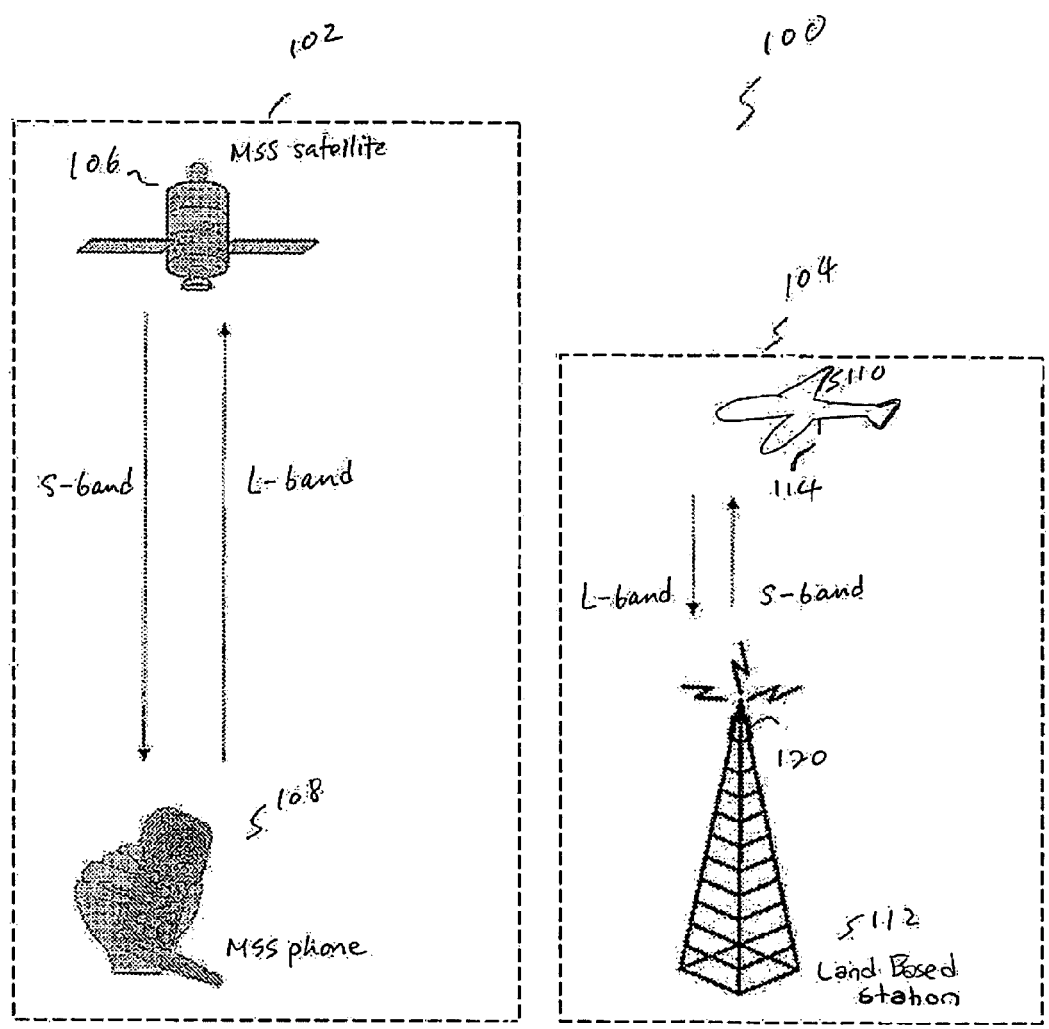
FIG. 1 is a simplified schematic block diagram illustrating a system that can be used to provide aeronautical communication services according to the present disclosure.

FIG. 1 illustrates a system 100 that can be used to provide aeronautical communication services. The system 100 may include a first subsystem 102 and a second subsystem 104. The first subsystem 102 may include a mobile satellite service (MSS) system having a MSS satellite 106 and a MSS phone 108. Generally, the MSS uses a network of communications satellites to provide service to mobile phones. It provides a number of different satellite services including, for example, satellite phone service. In the MSS system, the MSS satellite 106 and the MSS phone 108 communicate with each other according to a frequency band or frequency plan which utilizes the S-band and the L-band. More specifically, the uplink from the MSS phone 108 to the MSS satellite 106 uses the L-band and the downlink from the MSS satellite 106 to the MSS phone 108 uses the S-band.

MSS is a well known satellite communications system and further details will not be described. It should also be noted that the MSS system is used herein for illustrative purposes. Accordingly, a person of ordinary skill in the art will appreciate other types of communication systems that can be used as the first subsystem according to the present disclosure. Moreover, for purposes of explanation, the second subsystem 104 will be described with reference to an aircraft. However, one of ordinary skilled in the art would appreciate that other types of aeronautical vehicles can be applied in the second subsystem 104.

The second subsystem 104 may include an aeronautical vehicle such as an aircraft 110 and a land-based station 112. The aircraft 110 may include an antenna 114 located thereon to facilitate communications with the land-based station 112.

The antenna 114 may be situated at various locations. For example, FIG. 1 shows the antenna 114 positioned at the bottom of the aircraft 110. The antenna 114 may be positioned at the bottom of the fuselage of the aircraft 110. The antenna 114 is strategically located on the aircraft 110 so as to minimize the interference with the first subsystem 102. In addition to the location, the antenna pattern, height and power level may be selected to minimize the interference with the first subsystem 102. Based on the disclosure and teachings provided herein, a person of ordinary skill in the art will know how to position the antenna 114 on the aircraft 110 to minimize interference.

Figure 2:
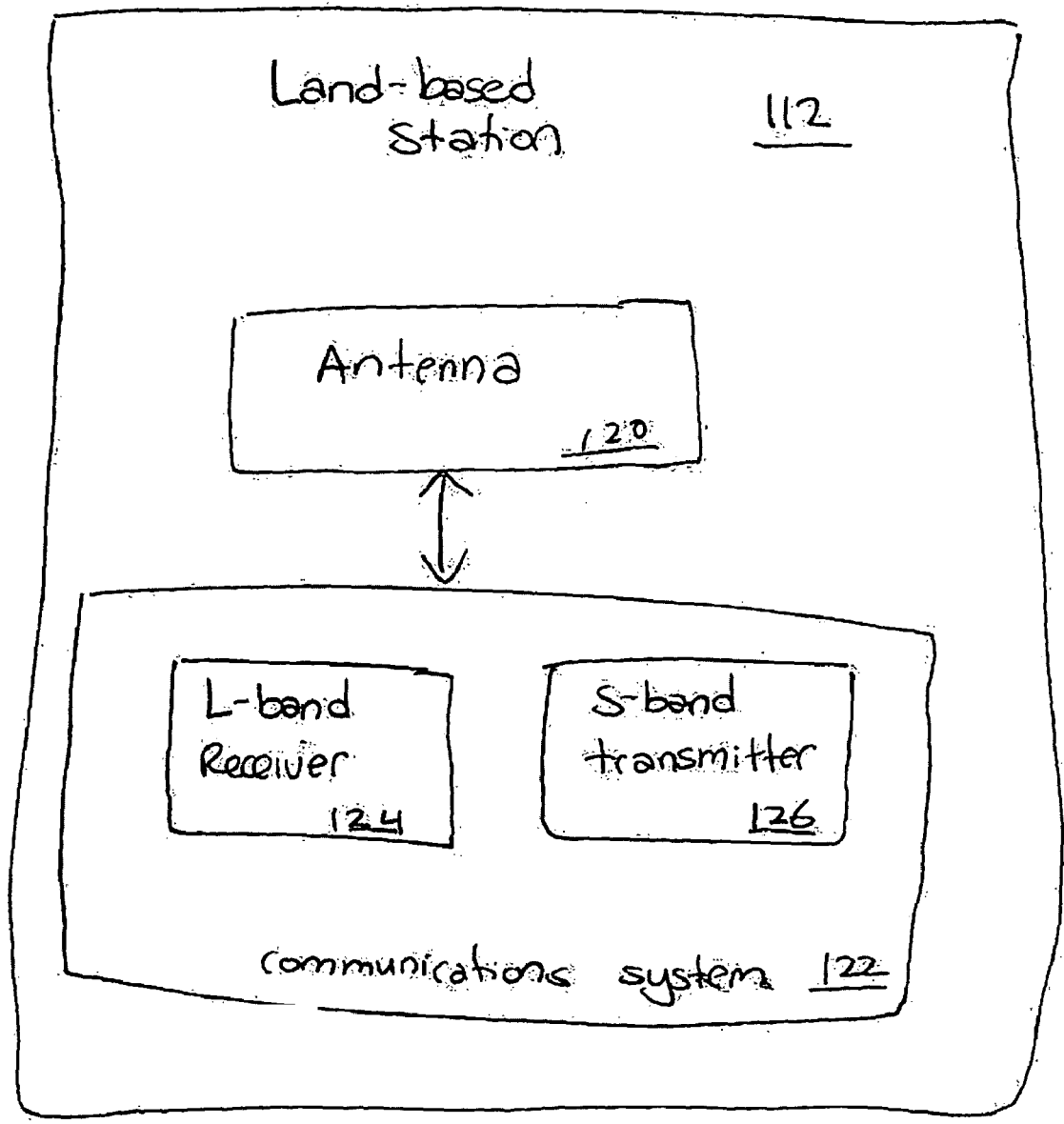
FIG. 2 is a simplified schematic block diagram illustrating an example of a land-based station.

The land-based station 112 may also include an antenna 120. FIG. 2 illustrates an example land-based station 112 including an antenna 120 and a communications system 122 to allow communication to and from an aeronautical vehicle such as the aircraft 110, wherein the aeronautical vehicle receives communications using a first low frequency band and transmits communications using a second low frequency band in accordance with a second aeronautical communication system. The communications system 122 may include a receiving unit configured to transmit communications using a first low frequency band and a transmitting unit configured to receive communications using a second low frequency band.

In the example land-based station 200, the second aeronautical communication system is assumed to be the MSS system, for purposes of explanation. Accordingly, the first low frequency band would be the L-band and the second low frequency band would be the S-band, and FIG. 2 shows the communications system 122 including a L-band receiver 124 and a S-band transmitter 126. The land-based station 112 may include other types of communication stations and/or entities that are capable of transmitting and receiving signals. For fixed land-based stations, the location of the land-based station 112 is selected to minimize the interference to the subsystem 102. Similarly, the pattern, height and the power level of the antenna 120 is selected to minimize the interference to the subsystem 102.

Based on the disclosure and teachings provided herein, a person of ordinary skill in the art will appreciate how to employ various components and/or devices to implement the second subsystem 104 according to the present disclosure.

Figure 3:
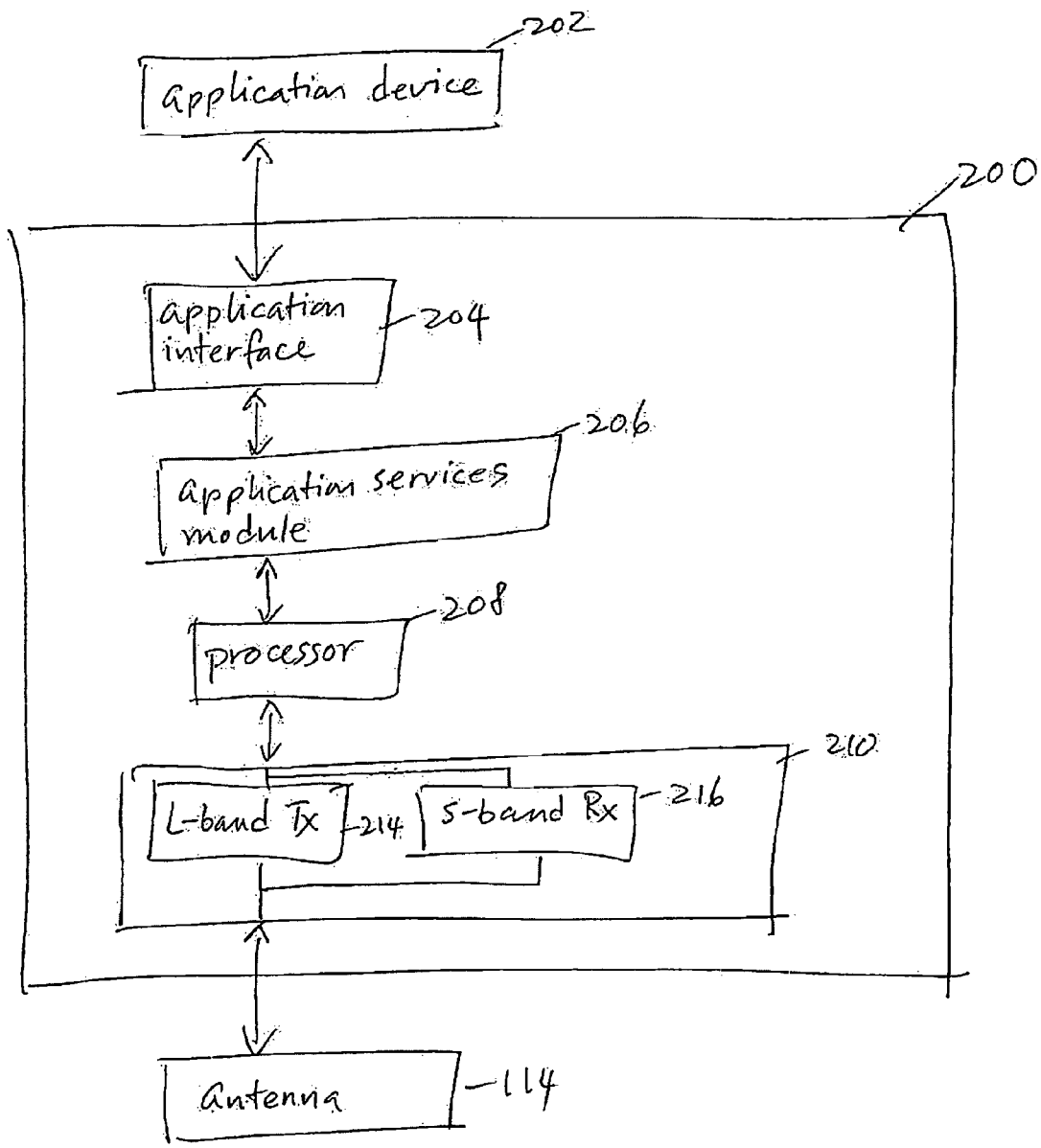
FIG. 3 is a simplified schematic block diagram illustrating how aeronautical communication services can be provided from an aircraft according to the present disclosure.

FIG. 3 illustrates a module 200 that can be used to provide aeronautical communication services on the aircraft 110. The module 200 may be situated anywhere on the aircraft 110. The module 200 may be separately implemented and later integrated into the aircraft. The module may also be implemented into the aircraft 100. Moreover, the module 200 can be independent or integrated into the aircraft control system (not shown) or other parts of the aircraft 100.

The module 200 may include an application interface 204, an application services module 206, a processor 208, and a transceiver 210 to allow communication to and from a land-based station, wherein the land-based station transmits communications using a first low frequency band and receives communications using a second low frequency band in accordance with a second aeronautical communication system. The transceiver 210 may include a transmitting unit configured to transmit communications using a first low frequency band and a receiving unit configured to receive communications using a second low frequency band. In the example module 200, the second aeronautical communication system is assumed to be the MSS system, for purposes of explanation. Accordingly, the first low frequency band would be the L-band and the second low frequency band would be the S-band, and FIG. 3 shows the transceiver including a L-band transmitter 214 and a S-band receiver 216.

The module 200 may be coupled to the antenna 114 to facilitate communications with the land-based station 112. The antenna 114 may be part of the module 200 or, alternatively, coupled to the module 200 via a wired or wireless connection (not shown). The module 200 may further interface with an application device 202 to allow application services to be provided to a user of the application device 202, as will be further described below. The application device 202 may include a mobile phone, a personal digital assistant, other types of electronic devices or a combination thereof.

A variety of aeronautical communication application services may be provided. Some application services may be consumer/passenger-oriented including, for example, phone service and data communications. Other application services 118 may include services that are used to operate and provide in-flight guidance and maintenance for the aircraft 110. The application device 202 may interact with the application services module 206 via the application interface 204 to obtain the desired application service. The application device 202 may interact with the application interface 204 via a wired or wireless connection. The processor 208 may interact with the application service module 206 and provide the desired application service. For example, the processor 208 may generate the appropriate signals and forward such signals to the transceiver 210. The processor 208 may be configured to control the transmission of communications using the first low frequency band and the reception of communications using the second frequency band.

In the example, the processor 208 may control the transmission of communications using the frequency band of the L-band and/or control the reception of communications using the frequency band of the S-band. More particularly, the processor 208 may control the L-band transmitter 214, for transmission to the land-based station 112 via the antenna 114 using the L-band. In response, the land-based station 112 may forward the appropriate signals to module 200 via the antenna 114 using the S-band. Upon receiving the signals, the antenna 114 may forward the signals to the S-band receiver 216 which, in turn, may forward the signals to the processor 208. The processor 208 may then process the signals and direct the application services module 206 to provide the desired application service to the application device 202 via the application interface 204.

One illustrative example of an application service is mobile phone service. A passenger may use a mobile phone to request mobile phone service from the module 200 via the application interface 204. The application interface 204 may include a transceiver and associated control logic to facilitate communications with the mobile phone. The transceiver and associated control logic may be enabled to handle CDMA, Bluetooth and/or other types of technologies that may be used by the mobile phone. Signals from the mobile phone are forwarded to the application services module 206 and the processor 208. The processor 208 then converts the signals and generates any other additional signals for delivery to the land-based station 112 via the L-band transmitter 214 and the antenna 114.

In response, the land-based station 112 generates the appropriate signals and forwards such signals via the S-band to the antenna 114. The antenna 114, in turn, forwards the signals to the processor 208 via the S-band receiver 216. The processor 208 performs the appropriate signal conversion and then directs the application services module 206 to provide the requested application service to the mobile phone via the application interface 204. Provision of the application services by the module 200 can be implemented via control logic, in the form of hardware or software or a combination of both. Based on the disclosure and teachings provided herein, a person of ordinary skill in the art will appreciate how to implement and provide various aeronautical communication services from an aircraft according to the present disclosure.

As described above, by reversing the frequency bands used in the first subsystem 102, the same frequency bands may be re-used or shared by the second subsystem 104. As a result, more efficient spectrum utilization can be achieved. For example, for spectrum below 3 GHz, re-use of such spectrum via the system 100 may prove to be very efficient due to the scarce availability of spectrum below 3 GHz. It should be noted that the low frequency band is not limited to below 3 GHz and may include the spectrum above 3 GHz by one or some more GHz.

The system 100 is designed in such a way that interference between the first and second subsystems 102 and 104 is minimized. Again, for purposes of explanation, the interference will described with reference to MSS systems. In one type of potential interference, the MSS satellite 106 is the interferer and the aircraft 110 is the victim. Communications from the land-based station 112 to the aircraft 110 may be disrupted by the MSS satellite 106 because the MSS satellite 106 uses the S-band as the downlink to communicate with the MSS phone 108 and the land-based station 112 similarly uses the same S-band as the uplink to communicate with the aircraft 110. As a result, signals initiated by the MSS satellite 106 and intended for the MSS phone 108 may interfere with signals originated from the land-based station 112 and intended for the aircraft 110.

To minimize this first type of potential interference, the antenna 114 is situated on the aircraft 110 in such a way that signals from the MSS satellite 106 are shielded from the antenna 114 and signals from the land-based station 112 are maximized. Since the MSS satellite 106 is typically located in orbit above the aircraft 110, the antenna 114 may be positioned on the bottom of the aircraft fuselage. With the antenna 114 in such position, the body of the aircraft can be used to shield off signals from the MSS satellite 106 and, at the same time, the antenna 114 can also receive optimal exposure to the land-based station 112.

In a second type of potential interference, the aircraft 110 is the interferer and the MSS satellite 106 is the victim. Communications from the MSS phone 108 to the MSS satellite 106 may be disrupted by the aircraft 110 because the aircraft 110 uses the L-band as the downlink to communicate with the land-based station 112 and the MSS phone 108 similarly uses the L-band as the uplink to communicate with the MSS satellite 106. As a result, signals initiated by the aircraft 110 and intended for the land-based station 112 may interfere with signals originated from the MSS phone 108 and intended for the MSS satellite 106.

By positioning the antenna 114 as mentioned above, the aircraft 110 can also minimize the second type of potential interference. With the antenna 114 positioned on the bottom of the aircraft fuselage, signals from the antenna 114 can be directed toward the land-based station 112 and away from the MSS satellite 106. As a result, interference with the MSS satellite 106 attributed to signals from the aircraft 110 is minimized.

In a third type of potential interference, the land-based station 112 is the interferer and the MSS phone 108 is the victim. Communications from the MSS satellite 106 to the MSS phone 108 may be disrupted by the land-based station 112 because the land-based station 112 uses the S-band as the uplink to communicate with the aircraft 110 and the MSS satellite 106 similarly uses the S-band as the downlink to communicate with the MSS phone 108. As a result, signals initiated by the land-based station 112 and intended for the aircraft 110 may interfere with signals originated from the MSS satellite 106 and intended for the MSS phone 108.

To minimize the third type of potential interference, the land-based station 112 is designed such that its antenna 120 is aimed skyward toward the aircraft 110 and away from the MSS phone 108. In addition, the antenna 120 is typically positioned on top of the land-based station 112. Since the MSS phone 108 is generally located at ground level which is below the antenna 120, interference with the MSS phone 108 attributed to signals from the land-based station 112 is minimized. Additional mitigation techniques can also be used to further reduce interference on the MSS phone 108. Such additional mitigation techniques include, for example, providing sufficient guard band or frequency separation and providing proper filtering of the land-based station signals. Based on the disclosure and teachings provided herein, a person of ordinary skill in the art will know how to use various mitigation techniques to reduce interference according to the present disclosure.

In a fourth type of potential interference, the MSS phone 108 is the interferer and the land-based station 112 is the victim. Communications from the aircraft 110 to the land-based station 112 may be disrupted by the MSS phone 108 because the aircraft 110 uses the L-band as the downlink to communicate with the land-based station 112 and the MSS phone 108 similarly uses the L-band as the uplink to communicate with the MSS satellite 106. As a result, signals initiated by the MSS phone 108 and intended for the MSS satellite 106 may interfere with signals originated from the aircraft 110 and intended for the land-based station 112.

To reduce the fourth type of potential interference, the antenna 120 of the land-based station 112 is designed to have a narrow directional beam. For example, the antenna 120 can be designed such that it only receives signals coming from a particular direction which, in this case, are signals coming skyward from the aircraft 110. To generate narrow beams, a smart antenna may be used to track aircrafts. Designing narrow beams minimizes interference to the MSS system. In addition, due to a relatively higher gain of the narrow beam antennas, the MSS system would have a better link margin. Based on the disclosure and teachings provided herein, a person of ordinary skill in the art will know how to design an antenna for use with a land-based station as described above. Furthermore, additional mitigation techniques can be used to further reduce interference impact on the land-based station 112 by the MSS phone 108. Such mitigation techniques include, for example, providing adequate guard band or channel separation and frequency coordination.

Figure 4:
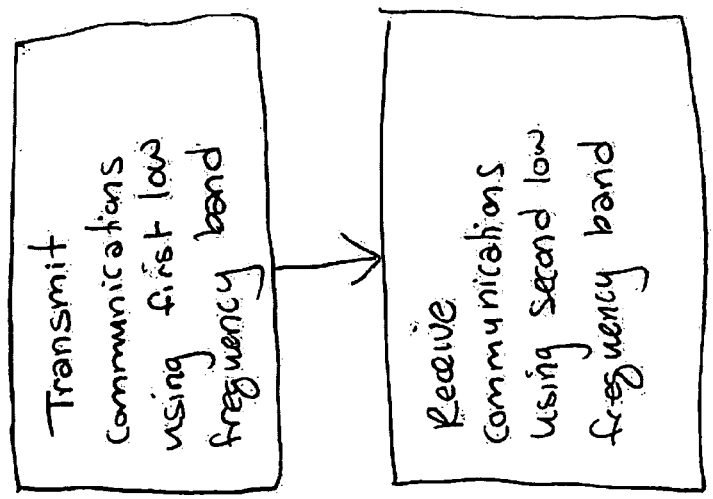
FIG. 4 is an example method of aeronautical communication.

FIG. 4 shows an example method 400 for use in an aeronautical vehicle in a first aeronautical communication system to allow communication to and from a land-based station, wherein the land-based station transmits communications using a first low frequency band and receives communications using a second low frequency band in accordance with a second aeronautical communication system. In the method 400, communication to the land-based station is transmitted 410 using the first low frequency band and communication is received 420 from the land-based station using the second low frequency band. Assuming the second aeronautical communication system is the MSS system, the communication to the land-based station is transmitted using a frequency band of the L-band and communication is received from the land-based station using a frequency band of the S-band. The method 400 may further include positioning an antenna at the bottom of the aeronautical vehicle, wherein the antenna allows transmission and reception of communications. More particularly, the antenna may be positioned at the fuselage of the aeronautical vehicle.

Figure 5:
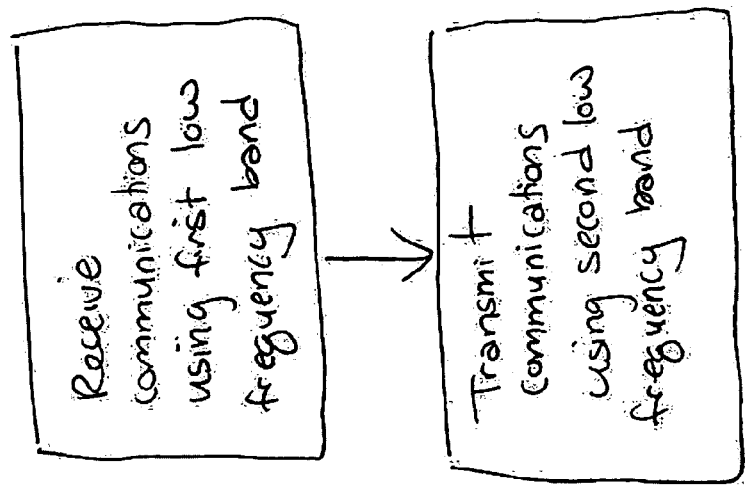
FIG. 5 is another example method of aeronautical communication.

FIG. 5 shows an example method 500 for use in a land-based station in a first aeronautical communication system to allow communication to and from an aeronautical vehicle, wherein the aeronautical vehicle receives communications using a first low frequency band and transmits communications using a second low frequency band in accordance with a second aeronautical communication system. In the method 500, communication from the aeronautical vehicle is received 510 using the first low frequency band and communication is transmitted 520 to the aeronautical vehicle using the second low frequency band. Assuming the second aeronautical communication system is the MSS system, the communications from the aeronautical vehicle is received using a frequency band of the L-band and communication is transmitted to the aeronautical vehicle using a frequency band of the S-band. The method 500 may further include positioning an antenna at the bottom of the aeronautical vehicle, wherein the antenna allows transmission and reception of communications. The method 500 may further include one or a combination of aiming the antenna skyward to allow transmission and reception of communications, positioning the antenna on top of the land-based station to allow transmission and reception of communications, designing the antenna to minimize interference to the second aeronautical communication system; and/or designing the antenna to generate a narrow directional beam to allow transmission and reception of communications.

In addition to the MSS system, the system as described above according to the present disclosure can also be deployed in various other systems and applications. For example, the system can be deployed for use in a fixed satellite service system and a ground-to-air communications system. Based on the disclosure and teachings provided herein, a person of ordinary skill in the art will appreciate how to deploy the system in other applications according to the present disclosure.

Furthermore, it should apparent to those skilled in the art that the elements of land-based station 112 and/or module 200 may be rearranged without affecting the operation of the aeronautical communication. Also, although one antenna is shown, more than one antennas may be implemented in one or both the land-based station 112 and module 200 in order to carry out the aeronautical communication.

Moreover, the various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

The invention claimed is:

1. Apparatus for an aircraft in a first aeronautical communication system to allow communication to and from a land-based station, wherein the land-based station transmits communications using a first low frequency band and receives communications using a second low frequency band in accordance with a mobile satellite service system, the apparatus comprising:
    a transmitting unit configured to transmit communications from the aircraft to the land-based station using the first low frequency band, wherein the first low frequency band is an L-band and a fuselage of the aircraft shields transmission of the communications according to the first low frequency band to the land-based station from interference from an orbiting satellite receiving other transmissions from the land-based station using the first low frequency band; and
    a receiving unit configured to receive communications from the land-based station using the second low frequency band, the second low frequency band is distinct from the first low frequency band.

2. The apparatus of claim 1, further comprising:
    an antenna coupled to the transmitting unit and the receiving unit and configured to allow the transmission and reception of the communications,
    wherein the antenna is positioned at a bottom of the aircraft.

3. The apparatus of claim 2, wherein the antenna is positioned on the fuselage.

4. Apparatus for a flying vehicle with fixed wings to allow aeronautical communication to and from a land-based station, comprising:
    a transmitting unit configured to transmit communications from the flying vehicle with fixed wings to the land-based station using a frequency band of a L-band; and
    a receiving unit configured to receive communications from the land-based station using a frequency band of a S-band, wherein a fuselage of the flying vehicle shields the communications from the land-based station from interference from transmissions from an orbiting satellite transmitting in the S-band.

5. The apparatus of claim 4, further comprising:
    an antenna coupled to the transmitting unit and the receiving unit and configured to allow transmission of the communications from the flying vehicle and reception of the communications from the land-based station,
    wherein the antenna is positioned at a bottom of the flying vehicle.

6. The apparatus of claim 5, wherein the antenna is positioned on the fuselage of the flying vehicle.

7. A powered flying vehicle with fixed wings for use in a first aeronautical communication system to allow communication to and from a land-based station, wherein the land-based station transmits communications using a first low frequency band and receives communications using a second low frequency band in accordance with a second aeronautical communication system, the second aeronautical communication system is a mobile satellite service system, the powered flying vehicle with fixed wings comprising:
    a transmitting unit configured to transmit communications from the powered flying vehicle with fixed wings to the land-based station using the first low frequency band, wherein the first low frequency band is an L-band and a fuselage of the powered flying vehicle mitigates interference from transmissions from the land-based station to an orbiting satellite using the first low frequency band; and
    a receiving unit configured to receive communications from the land-based station using the second low frequency band, the second low frequency band is distinct from the first low frequency band and is an S-band.

8. The powered flying vehicle with fixed wings of claim 7, further comprising:
    an antenna coupled to the transmitting unit and the receiving unit and configured to allow transmission of the communications from the powered flying vehicle and reception of the communications from the land-based station,
    wherein the antenna is positioned at a bottom of the powered flying vehicle with fixed wings.

9. The powered flying vehicle with fixed wings of claim 8, wherein the antenna is positioned on the fuselage of the powered flying vehicle with fixed wings.

10. A method for use in an aeronautical vehicle that sustains powered flight through a fixed wing and thrust from a gas turbine engine in a first aeronautical communication system to allow communication to and from a land-based station, wherein the land-based station transmits communications using a first low frequency band and receives communications using a second low frequency band in accordance with a second aeronautical communication system, the method comprising:
    transmitting communications from the aeronautical vehicle to the land-based station using the first low frequency band;
    receiving communications from the land-based station using the second low frequency band, wherein the first low frequency band is an L-band, the second low frequency band is an S-band; and
    shielding, by a fuselage of the aeronautical vehicle, reception of the communications from the land-based station and transmission of the communications to the land-based station from interference from transmissions from an orbiting satellite that transmits or receives signals using the first low frequency band or the second low frequency band.

11. The method of claim 10, further comprising:
positioning an antenna at a bottom of the aeronautical vehicle, wherein the antenna allows transmission of the communications to the land-based station and reception of the communications from the land-based station.

12. A processor for an aeronautical vehicle in a first aeronautical communication system to control communication to and from a land-based station, wherein the land-based station transmits communications using a first low frequency band and receives communications using a second low frequency band in accordance with a second aeronautical communication system and wherein an aerodynamic force acting on an airfoil associated with the aeronautical vehicle sustains continuous flight of the aeronautical vehicle, the processor configured to control:
transmission of communications to the land-based station from the aeronautical vehicle using the first low frequency band, wherein the transmission of the communications to the land-based station are shielded from interference from an orbiting satellite receiving communications from the land-based station using the first low frequency band by a fuselage of the aeronautical vehicle; and
reception of communications from the land-based station to the aeronautical vehicle using the second low frequency band, wherein the first low frequency band is an L-band frequency band and the second low frequency band is an S-band frequency band.

13. The processor of claim 12, wherein the processor is configured to control the transmission of the communications using the L-band frequency band.

14. The processor of claim 12, wherein the processor is configured to control the reception of the communications using the S-band frequency band.

15. An aeronautical vehicle for allowing aeronautical communication to and from a land-based station, wherein the aeronautical vehicle achieves powered flight through use of an airfoil and an associated gas-turbine engine; the aeronautical vehicle comprising:
a transmitting unit configured to transmit communications from the aeronautical vehicle to the land-based station using a frequency band of an L-band, wherein the communications from the aeronautical vehicle to the land-based station are shielded from communication interference from an orbiting satellite receiving communications in the L-band by a body section of the aeronautical vehicle; and
a receiving unit configured to receive communications from the land-based station to the aeronautical vehicle using a frequency band of an S-band.

16. The aeronautical vehicle of claim 15, further comprising:
an antenna coupled to the transmitting unit and the receiving unit and configured to allow transmission of the communications from the aeronautical vehicle and reception of the communications from the land-based station,
wherein the antenna is positioned at a bottom of the aeronautical vehicle.

17. The aeronautical vehicle of claim 16, wherein the antenna is positioned at a fuselage of the aeronautical vehicle.

18. A method for use in an aeronautical vehicle to allow aeronautical communication to and from a land-based station, comprising:
transmitting communications to the land-based station from the aeronautical vehicle using a frequency band of an L-band;
receiving communications from the land-based station to the aeronautical vehicle using a frequency band of an S-band; and
protecting, with a body section of the powered flying vehicle, the communications from the land-based station to the aeronautical vehicle using the S-band and the communications from the aeronautical vehicle to the land-based station using the L-band from interference from an orbiting satellite transmitting in the S-band and from the land-based station transmitting in the L-band,
wherein the aeronautical vehicle is a powered flying vehicle with fixed wings.

19. An aeronautical vehicular system allowing aeronautical communication to and from a land-based station, comprising:
means for transmitting communications to the land-based station from a powered flying vehicle with fixed wings using a frequency band of an L-band; and
means for receiving communications from the land-based station to the aeronautical vehicle using a frequency band of an S-band; and
means for protecting, with a body section of the powered flying vehicle, the communications from the land-based station to the aeronautical vehicle using the S-band and the communications from the aeronautical vehicle to the land-based station using the L-band from interference from an orbiting satellite transmitting in the S-band and from the land-based station transmitting in the L-band.

* * * * *